United States Patent
Osanai et al.

(10) Patent No.: US 7,631,149 B2
(45) Date of Patent: Dec. 8, 2009

(54) SYSTEMS AND METHODS FOR PROVIDING FIXED-LATENCY DATA ACCESS IN A MEMORY SYSTEM HAVING MULTI-LEVEL CACHES

(75) Inventors: Takeki Osanai, Kanagawa (JP); Kenji Iwamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 11/459,495

(22) Filed: Jul. 24, 2006

(65) Prior Publication Data

US 2008/0022051 A1    Jan. 24, 2008

(51) Int. Cl.
*G06F 12/00* (2006.01)
*G06F 13/00* (2006.01)
*G06F 13/28* (2006.01)

(52) U.S. Cl. .................... 711/138; 711/154; 711/167
(58) Field of Classification Search ................. 711/138
See application file for complete search history.

(56) References Cited

U.S. PATENT DOCUMENTS

| | | | |
|---|---|---|---|
| 5,510,934 A | 4/1996 | Brennan et al. | |
| 6,327,665 B1 | 12/2001 | Osanai | |
| 6,360,298 B1 | 3/2002 | Osanai et al. | |
| 6,389,527 B1 | 5/2002 | Raam et al. | |
| 6,854,046 B1 * | 2/2005 | Evans et al. | 711/203 |
| 2003/0018855 A1 * | 1/2003 | McWilliams et al. | 711/128 |
| 2004/0078790 A1 * | 4/2004 | Wu et al. | 717/154 |
| 2006/0236079 A1 * | 10/2006 | Lin et al. | 712/229 |
| 2007/0022277 A1 * | 1/2007 | Iwamura et al. | 712/229 |

OTHER PUBLICATIONS

Texas Instruments, "Minimizing Pipeline & IBQ Delays", TMS320C55x; DSP Programmer's Guide (rev.A); Ch. 4.4, pp. 4-49-4-84.

* cited by examiner

*Primary Examiner*—Brian R Peugh
*Assistant Examiner*—Ryan Bertram
(74) *Attorney, Agent, or Firm*—Law Offices of Mark L. Berrier

(57) ABSTRACT

Systems and methods for bypassing lower level caches and enabling direct access to higher level caches in order to provide fixed data latency and increased amounts of immediately accessible storage. One embodiment comprises a memory system having multiple cache memories that have increasing data latencies and amounts of storage. In a first mode which is suitable to support a microprocessor mode of a dual-mode processor, each data access proceeds conventionally, with accesses to successively higher levels of cache memory. In a second mode which is suitable to support a DSP mode of the dual-mode processor, the memory system bypasses the lower level cache and directly accesses the higher level cache in order to achieve a fixed latency (with enough cache storage to be useful to operate the processor in a DSP mode.)

21 Claims, 4 Drawing Sheets

SYSTEMS AND METHODS FOR PROVIDING FIXED-LATENCY DATA ACCESS IN A MEMORY SYSTEM HAVING MULTI-LEVEL CACHES

BACKGROUND

1. Field of the Invention

The invention relates generally to data processing systems, and more particularly to systems and methods for improving memory access in data processing systems that utilize both a microprocessor mode and a digital signal processor (DSP) mode.

2. Related Art

Even though current computing systems provide far more computing power than computing systems which are only slightly older, they still do not meet the ever-increasing demand for more processing power. This demand remains ahead of current technologies and drives the development of new technologies that will provide even more computing power.

The need for increased computing power has been addressed in many ways. For example, one approach to addressing the need for increased computing power is to develop new manufacturing technologies and transistor-level component designs which allow computer systems to operate at increasing clock speeds. This allows the computer systems to execute increasing numbers of operations in a given amount of time. Another approach is to develop new designs for complex microprocessors which enable the use of correspondingly complex and powerful data processing techniques. Still another approach is to simplify and/or specialize the tasks to be performed by a processor and to fine-tune the operation of the processor to maximize the efficiency with which it performs these specialized tasks.

Each of these approaches to providing increased computing power has its own advantages and disadvantages. For example, one advance that has been made in the area of complex microprocessor design is the use of pipelining. Pipelining is a technique in which a processor operates on multiple instructions concurrently. Pipelining takes advantage of the fact that each instruction executed by the processor is executed in several stages. Consequently, when one instruction has completed a first stage of execution and has moved on to the next stage, a subsequent instruction can begin the first stage of execution, even though the first instruction has not completed execution. Pipelining thereby allows the execution of multiple instructions to overlap and, even though it may take several cycles for a single instruction to be executed, the concurrent execution of multiple instructions can allow one of the instructions to be completed (and execution of another instruction initiated) at each cycle. In other words, the throughput of the processor is increased.

One of the drawbacks of pipelining, however, is that it increases that complexity of the processing of each instruction. For instance, consider execution of a series of program instructions in which a value is computed in a first instruction, and the value is then used to compute a second value in the next instruction. Although this situation does not present a logical problem, it must be remembered that execution of the first instruction will not be complete before execution of the second instruction begins. As a result, the information which is needed for execution of the second instruction is not available when the instruction begins execution. This is referred to as a data hazard. The processor may also encounter control hazards. For instance, if the program branches to an instruction that is identified by the result of the first instruction, the processor does not know which instruction is next until execution of the first instruction is completed. A pipelined microprocessor must be designed to detect and handle data and control hazards in order to ensure proper execution of the program.

Simplified processors have advantages and disadvantages as well. Digital signal processors (DSPs) are often used when it is desired to process large amounts of data in a repetitive fashion. Because the DSP is optimized for a very specific data processing work load that has a high degree of both regularity and parallelism, it can perform data processing functions very quickly and efficiently. On the other hand, the DSP is not optimized for control functions such as instruction scheduling or hazard handling, and performs poorly in comparison to general-purpose microprocessors. Because the DSP is not optimized to handle data hazards or control hazards that can be easily handled by the microprocessor, a programmer must account for any potential hazards in writing the program for the DSP. For instance, the programmer must know how long it takes for data to be retrieved from memory, and must ensure that there is a sufficient delay between a data access and a subsequent instruction that will utilize the data. If the programmer does not avoid these hazards, errors will occur in the execution of the program.

More recently, dual-mode systems that utilize both pipelined processor technology and DSP technology have been developed. These systems may include both a microprocessor core and a DSP core, as well as logic to determine when one or the other should be used to execute program instructions. Alternatively, the systems may utilize a microprocessor that can function either normally (in a microprocessor mode) or in a DSP mode in which hazard detection and control functions are not used. If a group of program instructions to be executed are simple data processing tasks, the DSP core or DSP mode can be selected, and the benefit of high processing speed can be obtained. If the program instructions define more complex tasks and control functions, the microprocessor core or microprocessor mode can be selected to take advantage of the full hazard detection and control capabilities of the microprocessor. These dual-mode systems thereby attempt to gain the best of both (pipelined processor and DSP) worlds.

Because the development of such dual-mode data processing systems is in its early stages, these systems are constructed using supporting components and/or subsystems that were designed for one mode or the other, but not both. For example, memory architectures that are used with these systems are the type that are normally used with pipelined microprocessors. These architectures typically include multiple levels of cache memories to reduce data latencies while still allowing a great deal of flexibility. In these architectures, a first-level (L1) cache has a small amount of memory that can be very quickly accessed, and may have intermediate-level caches (e.g., L2, L3) which have increasing amounts of memory, but also increasing data latencies with each successive level. Finally, there is a main memory which has a great deal of space for data storage, but may have very long data latencies. Typically, a processor making a data access will first attempt to access the L1 cache, then the L2 cache, and so on, finally retrieving the data from the main memory if it is not found in any of the caches.

This multi-level cache architecture is well-suited for use with a pipelined microprocessor because recently used or frequently used data can be accessed very quickly. Generally speaking, the less recently (or frequently) data is used, the greater the data latency with which the data can be accessed. While the flexibility of this type of memory architecture works well with a complex, pipelined microprocessor, it is not well-suited for use with a DSP, or a microprocessor operating in a DSP mode. As noted above, a DSP is not designed to handle data or control hazards, and it is the responsibility of the DSP programmer to account for potential hazards. Consequently, the variable data latencies of these multi-level cache memory architectures present problems for the DSP programmer, who cannot predict the data latencies that will be encountered in executing the DSP program instructions.

It would therefore be desirable to provide systems and methods for enabling data accesses in dual-mode data processors, where the data accesses can be made either with the shortest possible (but variable) latencies, or with fixed, predictable latencies. Further, it would be desirable to provide more data storage than is typically available in an L1 cache, and to have data latencies that are less than the latencies associated with accesses to main memory.

SUMMARY OF THE INVENTION

One or more of the problems outlined above may be solved by the various embodiments of the invention. Broadly speaking, the invention comprises systems and methods for bypassing lower level caches and enabling direct access to higher level caches in order to provide fixed data latency and increased amounts of immediately accessible storage. Some embodiments of the invention may be used, for example, in conjunction with dual-mode processors to provide minimized data latency for accesses in a microprocessor mode and fixed latency in a digital signal processor (DSP) mode.

One embodiment of the invention comprises a memory system having multiple cache memories. The cache memories include a first cache (e.g., L1) and a second cache (e.g., L2.) The latency of data accesses to the first cache is less than the latency of accesses to the second cache, and the amount of data that can be stored in the first cache is less than the amount of data that can be stored in the second cache. The memory system is operable in two different modes. In a first mode which is used in conjunction with a microprocessor mode of a processor, each data access proceeds conventionally. In other words, the system accesses the first cache prior to accessing the second cache, third cache, and so on. In the second mode, the system bypasses the first cache and directly accesses the second cache in order to achieve a fixed latency (with enough cache storage to be useful to operate the processor in a DSP mode.)

The memory system may be provided to support operation of a processor that can execute instructions in either a microprocessor mode or a DSP mode. The processor may be capable of executing multiple threads concurrently, and the memory system may be configured to switch between operating modes when the processor switches between threads that are associated with different (microprocessor or DSP) threads. If the second cache is a set associative cache, the system may be configured to lock individual sets of the cache according to the thread being executed. The processor may be configured to enable or disable hazard logic when it operates in the microprocessor or DSP modes, respectively. The system may include attribute bits in entries of a translation lookaside buffer (TLB) to indicate whether data or instructions being accessed by the processor should be executed in the microprocessor or DSP mode. The system may be configured to flush, synchronize and/or prefetch data to fill the second cache when entering the second (DSP) mode.

Another embodiment of the invention comprises a method implemented in a multi-level caching memory system. The method includes, in a first mode, conventionally accessing successive levels of cache memories (e.g., L1, then L2, and so on) and then the main memory in order to achieve minimum data latency. The method further includes, in a second mode, bypasses one or more lower level caches and directly accessing a higher level cache, thereby providing fixed data latency and increased cache storage compared to the smaller, lower level caches. The method may include setting the mode of the memory system to match the mode of a corresponding processor, setting the memory mode to match a thread currently executing in the processor, locking the higher level cache or sets of entries within the cache according to the mode, flushing, synchronizing and/or prefetching data to the higher level cache, and so on.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
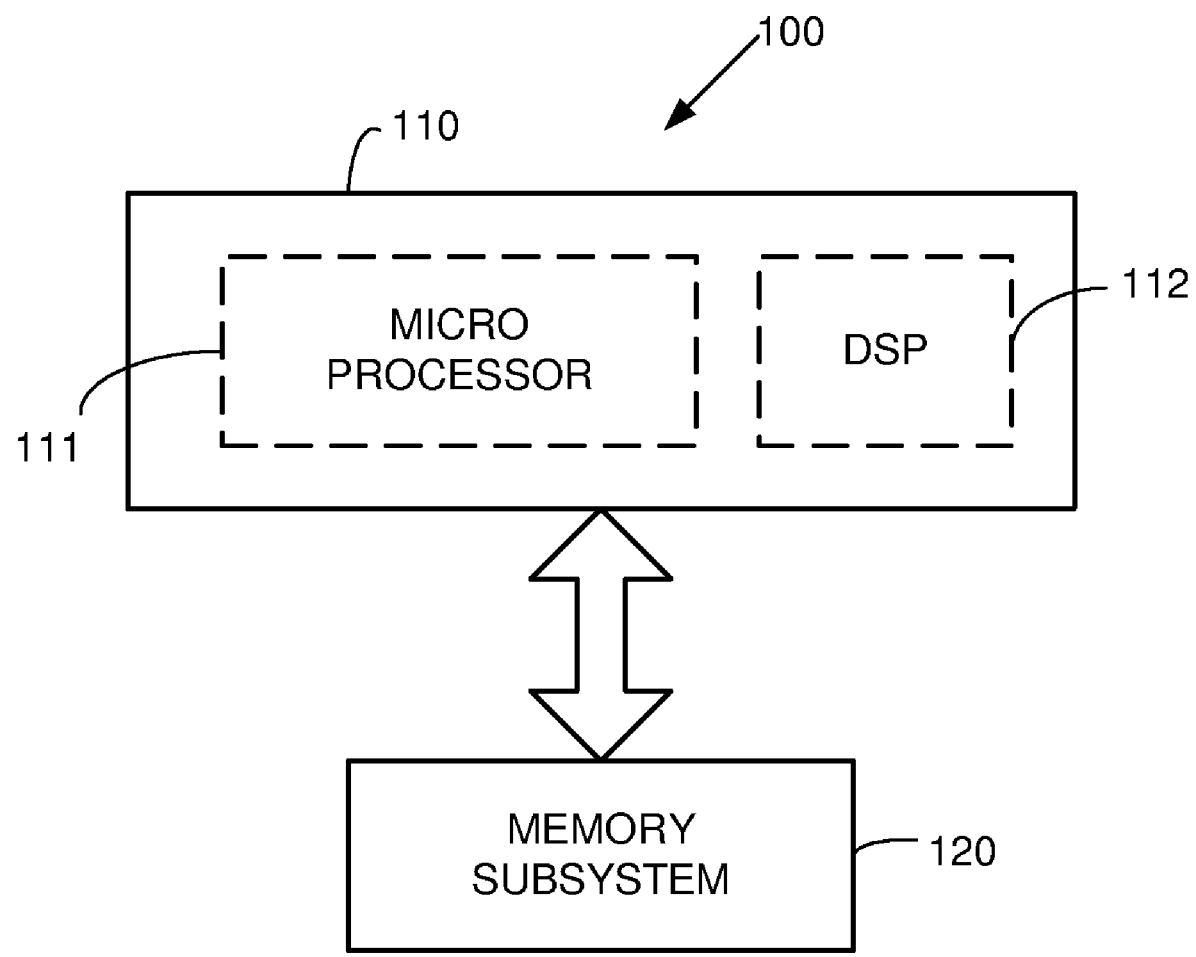
FIG. 1 is a simplified block diagram illustrating the structure of a data processing system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for providing data accesses in a dual-mode data processing system, where in a DSP mode, a smaller, faster L1 cache is bypassed, and data accesses are made directly to a larger, slower intermediate level (e.g., L2) cache. In one embodiment, a dual-mode microprocessor (having a microprocessor mode and DSP mode) is utilizes a multi-level cache memory architecture. Means are provided to determine whether program instructions to be executed by the dual-mode system should be executed in the microprocessor mode or the DSP mode. If the instructions are to be executed in the microprocessor mode, data accesses are made to the various cache levels in a conventional manner. If the instructions are to be executed in the DSP mode, the L1 cache is bypassed, and data accesses are made directly to the L2 cache.

It should be noted that DSP's are exemplary of various different types of specialized processors that are optimized for particular data processing tasks, and that the advantages and disadvantages of DSP's described herein are applicable to these other types of specialized processors. Accordingly, references herein to DSP's (and DSP modes) should be construed to include not only those processors that are considered to be digital signal processors, but also to media processors, streaming processors and other types of processors that are optimized for highly regularized processing sequences (and the respective operating modes.)

In one embodiment, a data processing system includes a microprocessor that is designed to operate alternately in a microprocessor mode in which it handles hazard detection and control functions, or in a digital signal processor (DSP) mode in which it performs high-speed data processing without the hazard detection or control functions of the microprocessor mode. Because these two different operating modes have very different requirements with respect to memory accesses, the memory architecture that is implemented in this data processing system is also operable in two modes. In the first mode, which corresponds to the microprocessor mode, multiple levels of cache memories are utilized to provide faster access to data that is more likely to be used and slower access to data that is less likely to be used. In the second mode, which corresponds to the microprocessor's DSP mode, a smaller, faster cache such as a first level cache is bypassed in order to provide access to a larger cache with a fixed latency.

The data processing system is designed to execute program instructions using either the microprocessor mode or the DSP mode. The system therefore includes means to determine which of the operating modes will be used to execute certain instructions. In one embodiment, these means include explicit setting of the operating mode, identification of instructions that are associated with one mode or the other, and accesses to memory addresses that are associated with one mode or the other. When the mode for execution of certain instructions has been identified, the system not only selects the appropriate operating mode for executing the instructions, but also selects the appropriate mode of operation of the memory subsystem. In other words, the system selects the memory mode that matches the selected processing mode in order to optimize operation of the memory subsystem for the selected processing mode.

In the microprocessor mode, the memory subsystem makes use of the different levels of caches that are present. Thus, when the microprocessor makes a data access, the memory subsystem first accesses the L1 cache, then the L2 cache, and so on, finally accessing the main memory. When the microprocessor is operating in the DSP mode, on the other hand, data accesses bypass the L1 cache. The memory system instead directs the data accesses directly to one of the intermediate level caches, such as L2. The system thereby forgoes the faster access to the L1 cache in favor of a slower, fixed-latency access to the larger memory space of L2. When the microprocessor enters the DSP execution mode, L2 may be flushed and refilled with data that will be processed in the DSP mode.

Referring to FIG. 1, a simplified block diagram illustrating the structure of a data processing system in accordance with one embodiment is shown. In this embodiment, system 100 includes a dual-mode microprocessor 110 and a memory subsystem 120. System 100 may also include a variety of other components and/or subsystems (e.g., I/O subsystems) that are not explicitly shown in the figure since they are not important to the invention.

Dual-mode microprocessor 110 may consist of a single microprocessor that operates in either a microprocessor mode or a DSP mode, or it may consist of a microprocessor core 111 and a separate DSP core 112. When a software program is executed by microprocessor 110, particular groups of instructions may be executed in either the microprocessor mode or the DSP mode. If the instructions include control functions (e.g., jumps, branches, conditionally executed instructions and the like) or may have data or control hazards, the microprocessor mode should be selected for execution of the instructions. If, and other hand, the instructions do not include control functions or potential hazards, but instead simply define data processing tasks (particularly a large number of repetitive data processing tasks,) the microprocessor can more efficiently execute these instructions in the DSP mode, so this mode should be selected.

Whichever of the processing modes is selected to execute a particular set of instructions, execution of the instructions will be supported by memory subsystem 120. Memory subsystem 120 is coupled to microprocessor 110 (or to both microprocessor and DSP cores, if separate processor cores are used.) Because the microprocessor mode has memory requirements which differ from those of the DSP mode, memory subsystem 120 is configured to operate in two different modes. When the microprocessor mode has been selected to execute a set of instructions, memory system 120 operates in a first mode that utilizes multiple levels of cache memories so that data needed by the processor core to execute the instructions can be accessed as quickly as possible. Because multiple levels of cache memories are used, the data latency for each access may vary (from shorter latencies when the data resides in the L1 cache to longer latencies when the data resides in the L2 or higher caches, or in the main memory.) When the DSP mode has been selected to execute a group of instructions, memory system 120 operates in a second mode that bypasses the L1 cache (and possibly other caches) to provide direct access to a larger cache memory, and to ensure that the latency of data accesses to this larger cache are fixed. The fixed latencies allow programmers to account for the delays in accessing data and to thereby avoid hazards that would arise from variable data latencies.

Figure 2:
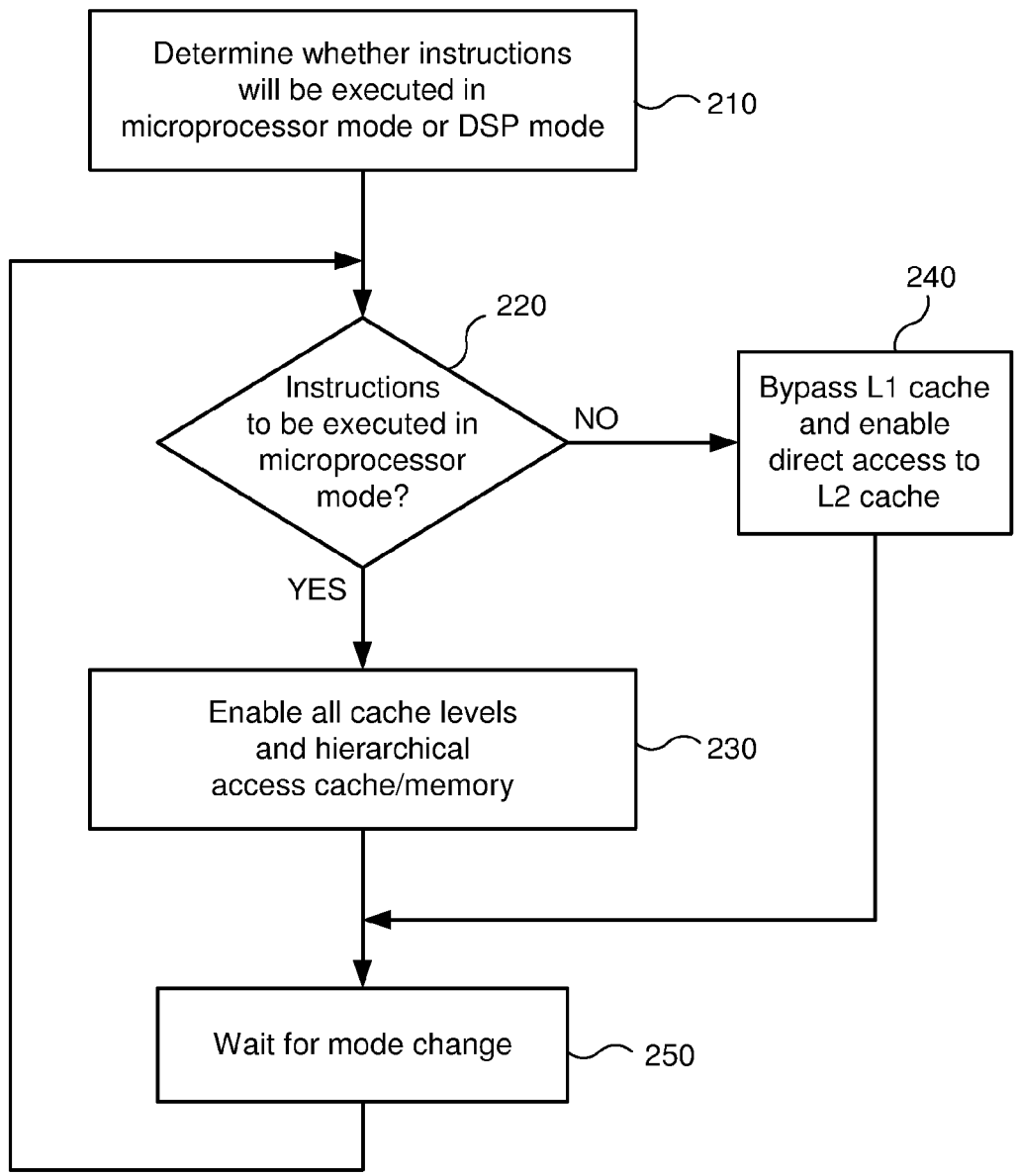
FIG. 2 is a flow diagram illustrating a simplified method in accordance with one embodiment.

Referring to FIG. 2, a flow diagram illustrating a simplified method in accordance with one embodiment is shown. FIG. 2 depicts a method for switching between a first mode of operation in which a memory subsystem is accessed conventionally and a second mode in which the memory subsystem enables bypassing of lower-level caches and direct access to higher level caches. The method begins with the determination of whether instructions that will be executed by the processor will be executed in a microprocessor mode or in a DSP mode (block 210.) If, at block 220, the instructions will be executed in the microprocessor mode, the method branches to block 230. At block 230, the multi-level caches of the memory subsystem are enabled. Memory accesses will therefore proceed in a conventional manner, with the accesses first being directed to the L1 cache, then the L2 cache, and so on, finally ending with a main memory access if necessary. If, at block 220, the instructions will be executed in the DSP mode, the method branches to block 240. At block 240, the memory subsystem enables a bypass of the L1 cache in favor of direct access to the L2 cache. After the mode of the memory subsystem is set at either block 230 or block 240, the system waits for a mode change (block 250.)

Although not explicitly shown in FIG. 2, the method may include various other steps associated with the setting the mode of the memory subsystem (and the processor.) For instance, caches may be locked/unlocked, flushed, synchronized, and so on. Similarly, within the processor, hazard detection logic may be enabled/disabled, power to selected components may be turned on or off, clock signals to certain components may be gated, etc. Some of these functions will be described in more detail below, and others will be apparent to persons of skill in the data processing arts.

Figure 3:
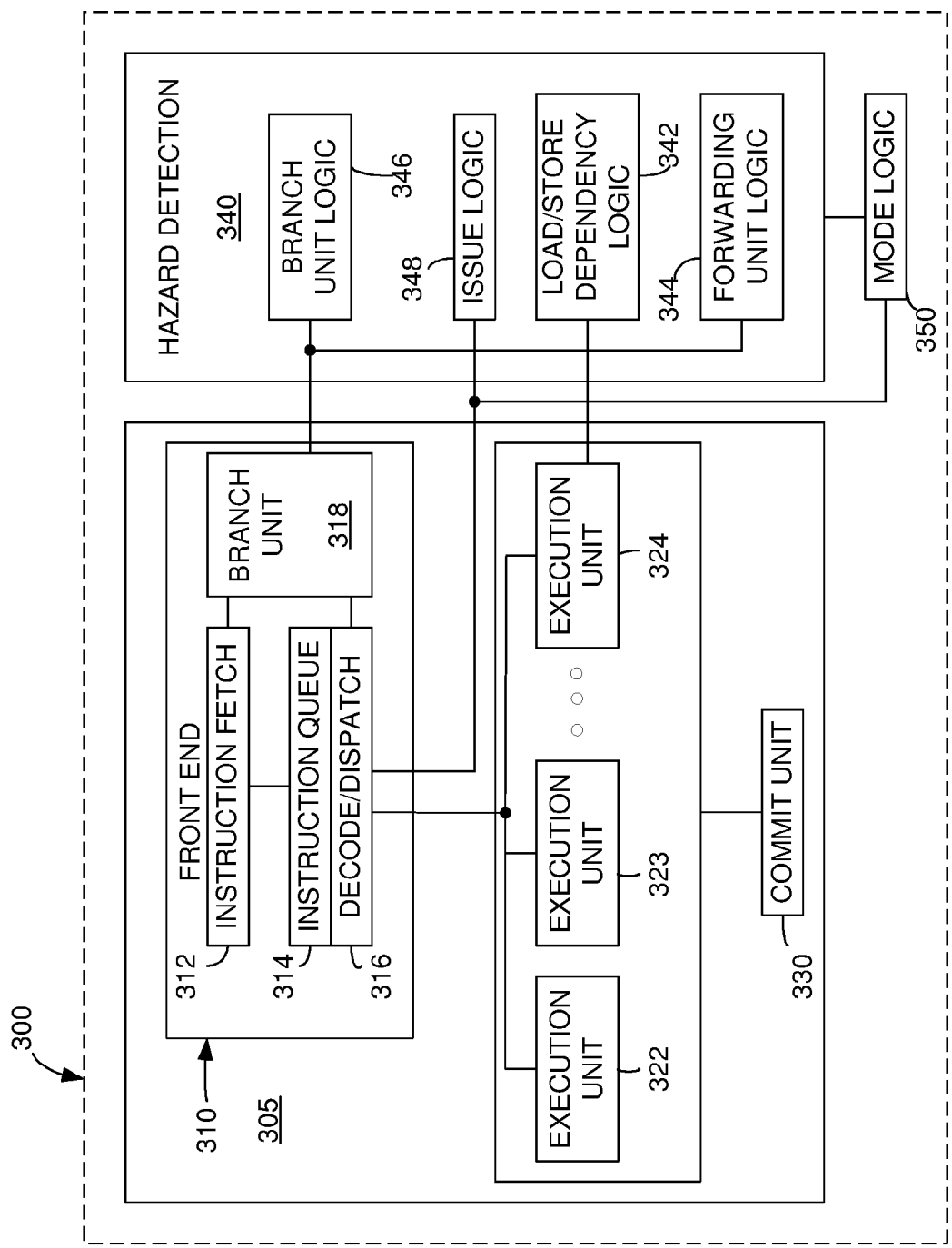
FIG. 3 is a diagram illustrating the structure of an exemplary microprocessor in accordance with one embodiment.

Referring to FIG. 3, a diagram illustrating the structure of an exemplary microprocessor in accordance with one embodiment is shown. This diagram is merely intended to be illustrative of a suitable microprocessor structure, and should not be construed as limiting of the types of microprocessors that can be used. Alternative structures may have more or fewer components, or may have more complicated or simpler architectures.

In this embodiment, microprocessor 300 includes a pipeline 305. Pipeline 305 has a front end 310, an execution core 320, and a commit unit 330. Microprocessor 300 also includes hazard detection logic 340, which is coupled to pipeline 305. Front end 310, includes a fetch unit 312, an instruction queue 314, a decode/dispatch unit 316 and a branch processing unit 318. Front end 310 supplies instructions to instruction queue 314 by accessing a memory such as an instruction cache. This access uses the address of the next instruction (obtained by incrementing the current instruction's address) or an address supplied by branch processing unit 318 (when a branch is predicted or resolved.) Front end 310 may fetch multiple instructions and store these instructions in instruction queue 314.

Decode/dispatch unit 316 includes logic for decoding instructions and for determining to which execution unit they should be forwarded. Instructions in instruction queue 314 are sequentially decoded by decode/dispatch unit 316 and are dispatched to the appropriate execution unit (e.g., 322-324) within execution core 320. Decoded instructions may be stored in a dispatch queue until they are dispatched to the corresponding execution units.

Execution units 322 are configured to execute different types of instructions that may be received from the dispatch logic of decode/dispatch unit 316. The execution units may include, for example, scalar arithmetic logic units and vector arithmetic logic units. Scalar arithmetic units may include single cycle integer units responsible for executing integer instructions and floating point units responsible for executing single and double precision floating point operations. The execution units may also include a load/store execution unit configured to, for instance, transfer data between a cache and a results bus, route data to other execution units, or transfer data to and from system memory. The load/store unit may also support cache control instructions and load/store instructions. Each of execution units 322-324 may comprise one or more execution stages within pipeline 305.

After instructions are executed by the various execution units in execution core 320, they may be forwarded to commit unit 330. Commit unit 330 is configured to reassemble the received instructions in the order in which they were issued, and to write the results of the instructions back to an earlier stage in the pipeline if necessary.

In normal operation (i.e., in the microprocessor mode,) hazard detection logic 340 is employed by microprocessor 300 during with the processing of instructions. Hazard detection logic 340 analyzes the instructions in execution units 322-324 of pipeline 305 to identify pipeline hazards which may result from the processing of these instructions. Hazard detection logic 340 may be able to adjust for instruction dependencies, or reduce delays caused by these dependencies. In one embodiment, hazard detection logic 340 includes issue logic 348, load/store dependency logic 342, forwarding unit logic 344 and branch unit logic 346. It should be noted that any or all of the hazard detection logic may be contained in various different parts of front end 310, execution core 320, commit unit 330 or other portions of microprocessor 300, and that the arrangement depicted in FIG. 3 is intended to be illustrative rather than limiting In addition to pipeline 305 and hazard detection logic 340, microprocessor 300 includes mode logic 350. As noted above, microprocessor 300 is designed to be operated in either a microprocessor mode or a DSP mode. Mode logic 350 is configured to determine which of these two modes should be used to execute a group of instructions, and to cause microprocessor 300 to enter the appropriate mode. As will be described in more detail below, mode logic 350 is also configured to cause the memory subsystem to mention the appropriate mode to match the microprocessor's mode of operation.

As described above, the primary difference between the microprocessor mode of operation and the DSP mode of operation is that, in the microprocessor mode, microprocessor 300 must detect various data and structural [control] hazards and handle the corresponding conditions in a manner that prevents errors from occurring in the execution of program instructions as a result of the hazards. In the DSP mode, it is assumed that any potential hazards have already been addressed by a programmer, who has written the instructions so as to avoid any hazards. Accordingly, it is not necessary for the microprocessor to detect or handle any hazards, and hazard detection logic 340 may be disabled. Mode logic 350 is therefore configured to enable hazard detection logic 340 while microprocessor 300 is operating in the microprocessor mode, and to disable the hazard detection logic while the microprocessor is operating in the DSP mode.

Figure 4:
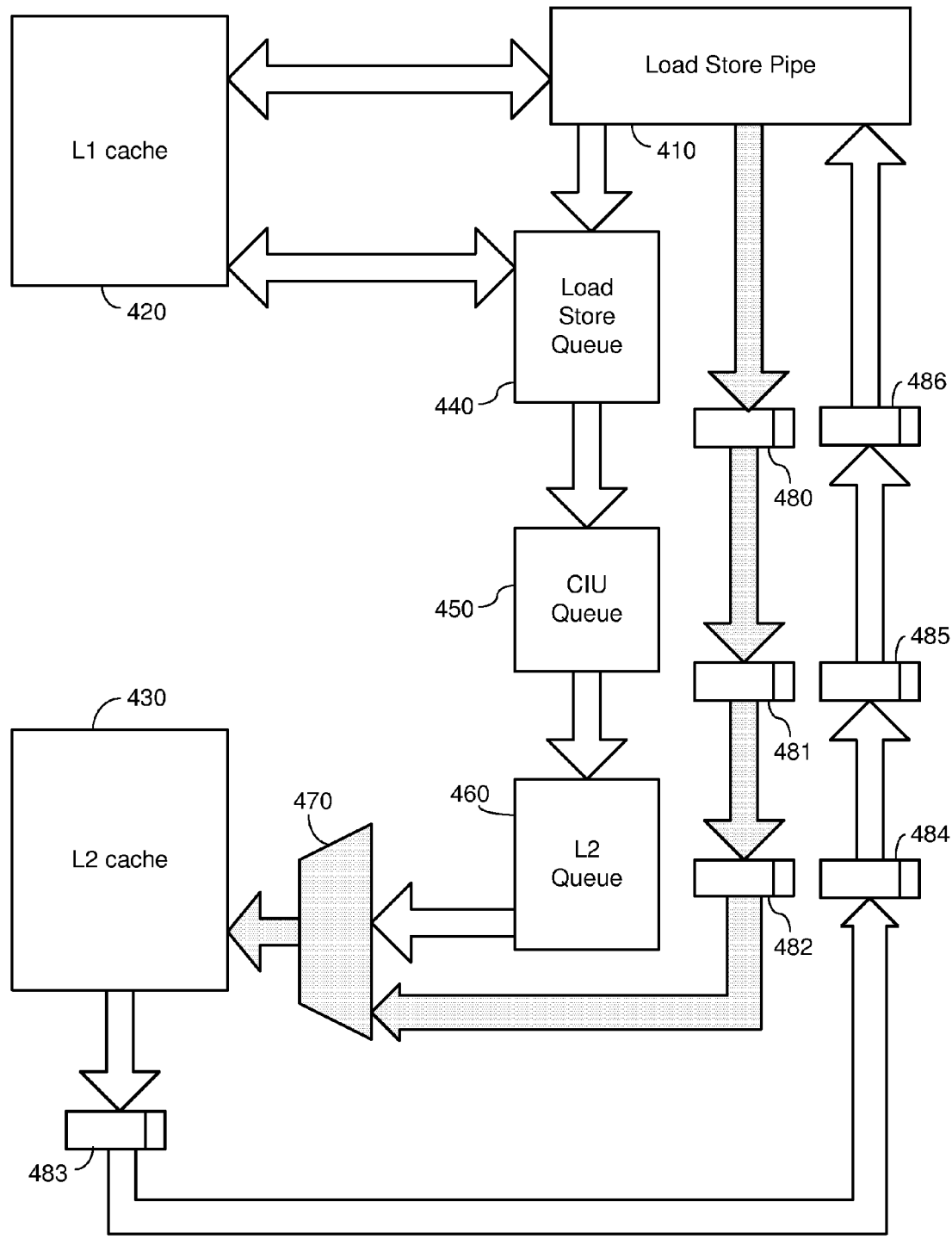
FIG. 4 is a diagram illustrating the partial structure of a memory subsystem in accordance with one embodiment.

Referring to FIG. 4, a diagram illustrating the partial structure of a memory subsystem in accordance with one embodiment is shown. The depicted portion of the memory system includes only the first two levels of caches, and does not depict the main memory or any higher-level caches that may be implemented between the L2 cache and the main memory. Because these other components of the memory subsystem are well known and understood by persons of ordinary skill, they will not be described in detail here.

As depicted in FIG. 4, the memory subsystem includes a load/store pipe 410, an L1 cache 420, an L2 cache 430, a load/store queue 440, a cache interface unit queue 450, an L2 queue 460, and a multiplexer 470. The memory subsystem also includes several latches 480-486 which are inserted into the data paths for the purposes of timing. As noted above, the memory subsystem is operable in two different modes, each of which is adapted to one of the processor's operating modes. In a first mode, which corresponds to the microprocessor mode of the processor, the memory subsystem is configured to access each of the caches in turn until the data access is successful (i.e., the data hits in the cache, or is accessed in the main memory.) In a second mode, which corresponds to the DSP mode of the processor, the memory subsystem is configured to bypass one or more lower-level caches (L1 in this embodiment) and to directly access a higher level cache (L2 in this embodiment.)

In order to support data access with as low a latency as possible in the first (microprocessor) mode, the memory subsystem includes multiple levels of cache memories as is known in the field. In order to minimize data latency, data accesses in load/store pipe 410 are first made to L1 cache 420. Some accesses are made directly, while other accesses are made through load/store queue 440. If the data is available in L1 cache 420, the data access is said to "hit" in this cache. The data can therefore be provided to the processor with a very short latency. If the data is not available in L1 cache 420, the data access is said to "miss" in the L1 cache. Because the data access was not successfully completed in L1 cache 420, the access is forwarded through cache interface unit 450 to L2 queue 460. The data access is then attempted in L2 cache 430.

If the data access hits in the L2 cache, the data is returned to load/store pipe 410 with a latency that is somewhat longer than the latency of a cache hit in L1 cache 420.

Although low data latencies may be beneficial in the DSP mode of the processor, this is not as important as having a fixed latency, since the processor cannot detect or handle hazards in this mode, and since the programmer must therefore know beforehand the latency of data accesses. Accordingly, in the second (DSP) mode of the memory subsystem, data accesses do not involve the entire hierarchy of caches. Instead, the memory system is designed to directly access a single one of the caches which is large enough to support the needs of the processor in the DSP mode. In the embodiment depicted in FIG. 4, data accesses in the DSP mode are made directly to L2 cache 430. This direct access is enabled by the additional data path through latches 480-482 and multiplexer 470. Multiplexer 470 is controlled by the same mechanism that controls the operating mode of the processor, so that when the DSP mode is selected, the bypass data path through latches 480-482 is selected instead of the data path through queues 440, 450 and 460. Whichever mode is selected, data is returned via the data path that includes latches 483-486.

In one embodiment, when the memory subsystem enters the second mode of operation and bypasses the L1 cache, it not only enables direct access to the L2 cache, but also locks the L2 cache. Locking the L2 cache reserves the use of this cache for use by the processor in the DSP mode. If the L2 cache is organized as a set associative cache, one or more of the sets or "ways" of the cache may be reserved for use by the processor in the DSP mode. If the processor is capable of operating in a multi-threaded fashion, the L2 cache may be locked in a thread-wise manner. For instance, one or more of the sets or "ways" of the cache may be reserved for use by a DSP-mode thread that is being executed by the processor, while other sets of the cache may be reserved for use by threads that are executing in the microprocessor mode.

As noted above, the mode logic of the processor may be configured to determine when the processor should operate in the microprocessor mode or the DSP mode, and to set the memory subsystem to the appropriate mode as well. The mode logic may be configured to determine the proper mode of operation in a variety of ways. For example, in one embodiment, the mode may be determined by an explicit instruction which may be issued from the decode/dispatch unit of the processor. This instruction may be a part of the processor's instruction set architecture and may function as a sync instruction as well.

The sync instruction is included in some instruction set architectures and serves to ensure that instructions issued before the sync instruction are completed before instructions issued after the sync instruction are executed. In the present system, this instruction could be used to ensure completion of previously issued instructions before the mode is changed, and use of the new mode in executing subsequent instructions. In one embodiment, the cache could be flushed before the sync instruction is issued in order to facilitate locking of the cache. By flushing the cache, all of the instructions in the cache are invalidated, so all of the cache entries can immediately be replaced with new entries that are needed by the new (e.g., DSP) mode. In another embodiment, sync instructions may be issued before and after the cache is flushed. The system may be configured to prefetch DSP data to fill the cache when the system enters the DSP mode. The attributes of the cache tags may be visible to software, so that prefetching DSP data and subsequently setting the attribute bits of the cache tags to indicate that the corresponding data is valid can enable the processor to be aware that the prefetch has been completed.

In another embodiment, the mode could be determined by examining a set of mode bits. A register can be provided to store a set of bits which explicitly identify the mode of the processor. The mode could then be changed by appropriately setting the bits in the mode register, e.g., by an external controller or a boundary-scan (JTAG) controller. The mode register could be a memory-mapped register, so that the mode would be set according to data stored at a corresponding location in memory. In yet another embodiment, the mode could be determined by associating certain locations in the main memory with corresponding modes. Thus, if a particular location is associated with the microprocessor mode, accesses to instructions or data at this location could cause the processor to be set to the microprocessor mode. On the other hand, if the location is associated with the DSP mode, an access to this location would cause the processor to be set to the DSP mode.

Information regarding the mode associated with instructions/data at a particular location in memory can also be included in a translation lookaside buffer (TLB). In one embodiment, attribute bits could be added to each entry in the TLB to identify the L2 cache, and/or a particular set within the cache as the location at which the instructions/data can be found. Thus, for example, a TLB entry could include the virtual address for a page in memory, the corresponding physical page, a bit indicating that the page is in the L2 cache, and a bit indicating that the page is stored in a particular set of the cache.

In another embodiment, the instructions executed by the processor could be categorized, and each of the categories is associated with a corresponding mode. When the processor executes an instruction in a first category, it does so in the microprocessor mode. If the instruction falls within a second category, the processor executes the instruction in the DSP mode.

As explained above, the foregoing is a description of several exemplary embodiments which are intended to be illustrative of the invention, rather than limiting. For example, alternative embodiments may bypass additional lower-level caches (e.g., L1 and L2) and directly access a higher level cache (e.g., L3). Alternative embodiments may also bypass the lower level caches for reasons other than the use of a DSP mode in a microprocessor. Many other variations on the above embodiments will be apparent to persons of skill in the field of the invention, and these variations are intended to be within the scope of the invention, as defined by the claims below.

Those of skill in the art will understand that information and signals may be represented using any of a variety of different technologies and techniques. For example, data, instructions, commands, information, signals, bits, symbols, and the like that may be referenced throughout the above description may be represented by voltages, currents, electromagnetic waves, magnetic fields or particles, optical fields or particles, or any combination thereof. The information and signals may be communicated between components of the disclosed systems using any suitable transport media, including wires, metallic traces, vias, optical fibers, and the like.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A system comprising:
   a processor that is operable alternately in either a microprocessor mode or a DSP mode;
   a plurality of cache memories, including a first cache memory and a second cache memory, wherein a latency of data accesses to the first cache memory is less than a latency of data accesses to the second cache memory and wherein a data capacity of the first cache memory is less than a data capacity of the second cache memory;
   wherein
      in a first mode, for each data access, the system is configured to access the first cache memory prior to accessing the second cache memory, and
      in a second mode, for each data access, the system is configured to bypass the first cache memory and directly access the second cache memory;
   wherein in response to the processor operating in the microprocessor mode, each of a plurality of data accesses performed while the processor is operating in the microprocessor mode is performed in the first mode, and wherein in response to the processor operating in the DSP mode, each of a plurality of data accesses performed while the processor is operating in the DSP mode is performed in the second mode.

2. The system of claim 1, wherein in the first mode the system minimizes data latency of the data accesses, and wherein in the second mode the system fixes data latency of the data accesses.

3. The system of claim 1, wherein in response to operating in the second mode, the system is configured to lock the second cache memory.

4. The system of claim 3, wherein the second cache memory comprises a set associative cache memory, and wherein the system is configured to lock an individual set of entries within the second cache, wherein the locked set of entries is reserved for the second mode.

5. The system of claim 1, wherein the processor is configured to execute multiple threads concurrently, and wherein in response to the processor executing a thread that is associated with the microprocessor mode, the system operates in the first mode, and in response to the processor executing a thread that is associated with the DSP mode, the system operates in the second mode.

6. The system of claim 1, wherein the processor is configured to enable hazard logic in the microprocessor mode and to disable the hazard logic in the DSP mode.

7. The system of claim 1, wherein the system further comprises a translation lookaside buffer (TLB), and wherein each entry of the TLB includes attribute bits which indicate one of the first and second modes associated with data or instructions stored at a page indicated in the entry.

8. The system of claim 1, wherein the system is configured to flush the second cache in response to the system entering the second mode.

9. The system of claim 8, wherein the system is further configured to synchronize the second cache in response to the system entering the second mode.

10. The system of claim 9, wherein the system is further configured to prefetch data to fill all of the entries in the second cache in response to the system entering the second mode.

11. A method implemented in a memory system having at least a first cache memory and a second cache memory, wherein a latency of data accesses to the first cache memory is less than a latency of data accesses to the second cache memory and wherein a data capacity of the first cache memory is less than a data capacity of the second cache memory, wherein the memory system is coupled to a processor that is operable alternately in either a microprocessor mode or a DSP mode, the method comprising:
   in response to the processor operating in the microprocessor mode, performing each of a plurality of data accesses in the first mode while the processor is operating in the microprocessor mode;
   in response to the processor operating in the DSP mode, performing each of a plurality of data accesses in the second mode while the processor is operating in the DSP mode;
   in a first mode, making a data access to the first cache memory and then making the data access to the second cache memory only if the data access misses in the first cache memory; and
   in a second mode, bypassing the first cache memory and making the data access directly to the second cache memory.

12. The method of claim 11, further comprising, in response to operating in the second mode, locking the second cache memory.

13. The method of claim 12, wherein the second cache memory comprises a set associative cache memory, and wherein locking the second cache memory comprises locking an individual set of entries within the second cache, wherein the locked set of entries is reserved for the second mode.

14. The method of claim 11, wherein the processor is configured to execute multiple threads concurrently, the method further comprising operating the memory system in the first mode in response to the processor is executing a thread that is associated with the microprocessor mode, and operating the memory system in the second mode in response to the processor is executing a thread that is associated with the DSP mode.

15. The method of claim 11, further comprising enabling hazard logic in the processor when the processor is operating in the microprocessor mode and disabling the hazard logic when the processor is operating in the DSP mode.

16. The method of claim 11, wherein the system further comprises a translation lookaside buffer (TLB), the method further comprising setting attribute bits for each entry of the TLB which indicate one of the first and second modes associated with data or instructions stored at a page indicated in the entry.

17. The method of claim 11, further comprising flushing the second cache in response to the system entering the second mode.

18. The method of claim 17, further comprising synchronizing the second cache in response to the system entering the second mode.

19. The method of claim 11, further comprising prefetching data to fill all of the entries in the second cache in response to the system entering the second mode.

20. A system comprising:
a processor configured to concurrently execute multiple threads, wherein one or more of the threads are associated with a DSP mode;
a first cache memory coupled to the processor, wherein in response to the processor executing one of the one or more threads associated with the DSP mode the cache memory is configured to lock selected lines of the cache memory that are used by the one of the one or more threads associated with the DSP mode.

21. The system of claim 20:
further comprising a second cache memory having a data latency which is less than a data latency of the first cache memory;
wherein the processor is operable in either a microprocessor mode or the DSP mode;
wherein in response to the processor operating in the microprocessor mode, the system is configured to access the second cache memory prior to accessing the first cache memory, and in response to the processor le operating in the DSP mode, the system is configured to bypass the second cache memory and directly access the first cache memory.

* * * * *